US008985488B2

(12) United States Patent
Hidalgo García et al.

(10) Patent No.: US 8,985,488 B2
(45) Date of Patent: Mar. 24, 2015

(54) COMBINATION FOOD PROCESSING MACHINE

(75) Inventors: Javier Hidalgo García, Guipúzcoa (ES); Aitor Aguirrezabalaga Zubizarreta, Guipúzcoa (ES); Aitor Gogorza Segurola, Guipúzcoa (ES)

(73) Assignee: Sammic, S.L., Guipuzcoa (ES)

( * ) Notice: Subject to any disclaimer, the term of this patent is extended or adjusted under 35 U.S.C. 154(b) by 0 days.

(21) Appl. No.: 13/523,160

(22) Filed: Jun. 14, 2012

(65) Prior Publication Data

US 2012/0325948 A1    Dec. 27, 2012

(30) Foreign Application Priority Data

Jun. 21, 2011    (ES) .................................. 201100576 U

(51) Int. Cl.
  *B02C 9/04*    (2006.01)
  *A47J 36/10*    (2006.01)
  *A47J 43/046*    (2006.01)

(52) U.S. Cl.
  CPC .............. *A47J 36/10* (2013.01); *A47J 43/046* (2013.01)
  USPC ......................... 241/33; 241/101.3; 241/282.1

(58) Field of Classification Search
  CPC ........ A47J 2201/00; A47J 36/10; F16B 7/20
  USPC ............. 241/33, 35, 36, 91, 92, 101.2, 101.3, 241/278.1, 282.1, 282.2; 99/509, 510, 511, 99/512, 513; 403/348
  See application file for complete search history.

(56) References Cited

U.S. PATENT DOCUMENTS

| 2,554,888 | A | * | 5/1951 | Wood | 241/285.1 |
|---|---|---|---|---|---|
| 2,795,958 | A | * | 6/1957 | Frank | 74/16 |
| 3,104,901 | A | * | 9/1963 | Potter | 403/336 |
| 3,385,117 | A | * | 5/1968 | Braun | 74/16 |
| 3,892,365 | A | * | 7/1975 | Verdun | 241/92 |
| 3,951,351 | A | * | 4/1976 | Ernster et al. | 241/101.1 |
| 4,422,343 | A | * | 12/1983 | Falkenbach et al. | 74/16 |
| 4,741,482 | A | * | 5/1988 | Coggiola et al. | 241/37.5 |
| 5,404,614 | A | * | 4/1995 | Stephens | 15/327.2 |
| 5,524,530 | A | * | 6/1996 | Nijzingh et al. | 99/492 |
| 5,624,000 | A | * | 4/1997 | Miller | 173/216 |
| 5,660,493 | A | * | 8/1997 | Stephens | 403/348 |
| 5,852,968 | A | * | 12/1998 | Sundquist | 99/492 |
| 6,609,821 | B2 | * | 8/2003 | Wulf et al. | 366/206 |
| 6,632,013 | B2 | * | 10/2003 | Wulf et al. | 366/199 |
| 6,758,592 | B2 | * | 7/2004 | Wulf et al. | 366/205 |
| 6,860,764 | B2 | * | 3/2005 | Khoury | 439/638 |
| 7,520,659 | B2 | * | 4/2009 | Wulf et al. | 366/198 |
| 7,632,007 | B2 | * | 12/2009 | Wulf et al. | 366/142 |
| 7,841,764 | B2 | * | 11/2010 | Wulf et al. | 366/142 |
| 7,950,842 | B2 | * | 5/2011 | Pryor et al. | 366/142 |
| 7,993,054 | B2 | * | 8/2011 | Wulf et al. | 366/205 |
| 8,529,118 | B2 | * | 9/2013 | Davis et al. | 366/205 |

OTHER PUBLICATIONS

U.S. Appl. No. 13/534,642, filed Jun. 27, 2012, first named inventor Javier Hidalgo García.

\* cited by examiner

*Primary Examiner* — Faye Francis
*Assistant Examiner* — Leonel Vasquez
(74) *Attorney, Agent, or Firm* — Donald J. Ranft; Kristen A. Mogavero; Collen IP

(57) ABSTRACT

The invention relates to a combined food processing machine which accepts the incorporation of multiple accessories and a fast anchoring and fixing device which can be actuated by a user to secure an accessory to said machine. The invention also includes multiple detectors, particularly magnetic, for the purpose of automatically identifying the type of accessory which has been secured to the machine and determining the operating condition of said accessory.

8 Claims, 6 Drawing Sheets section 3-3

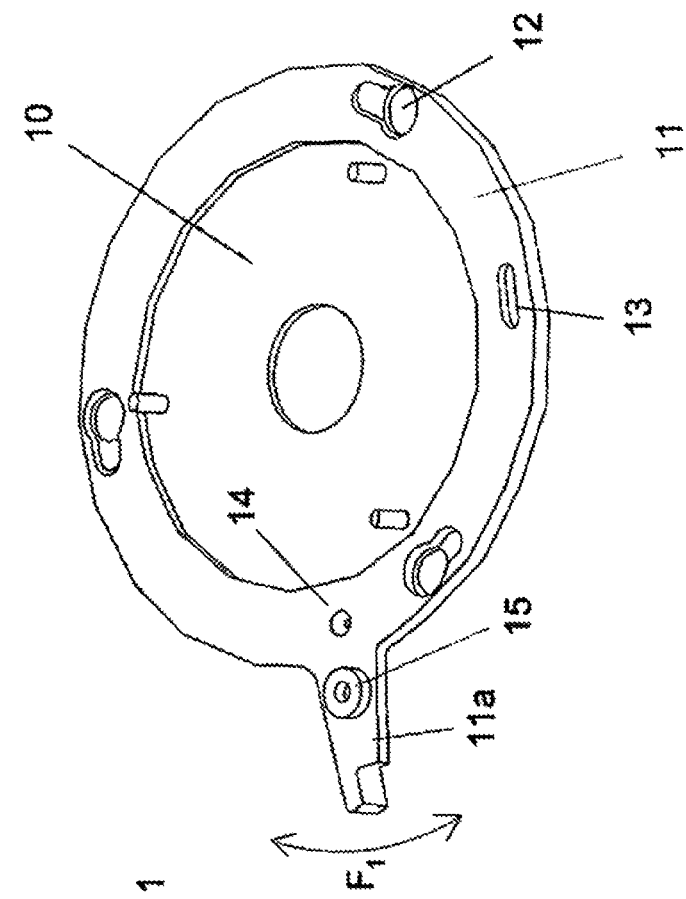
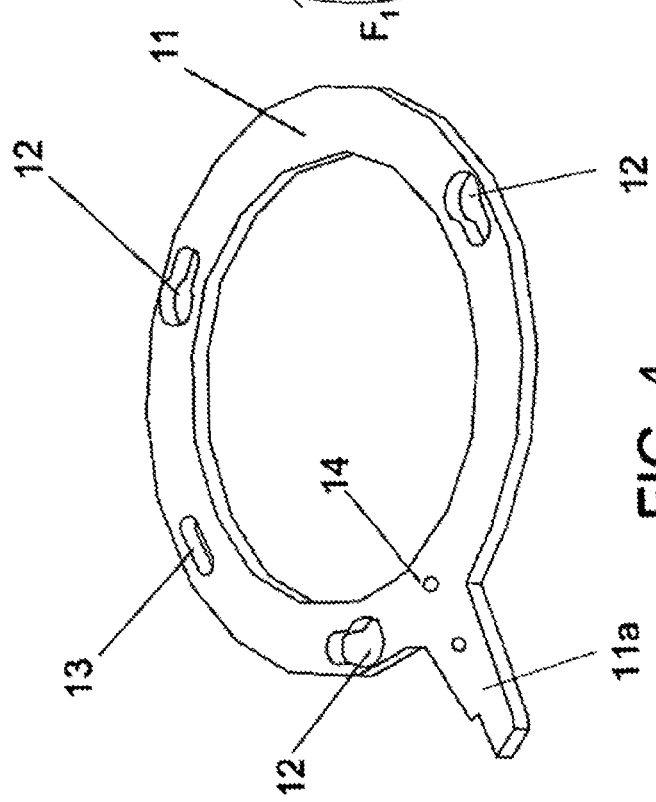
FIG. 5
FIG. 4

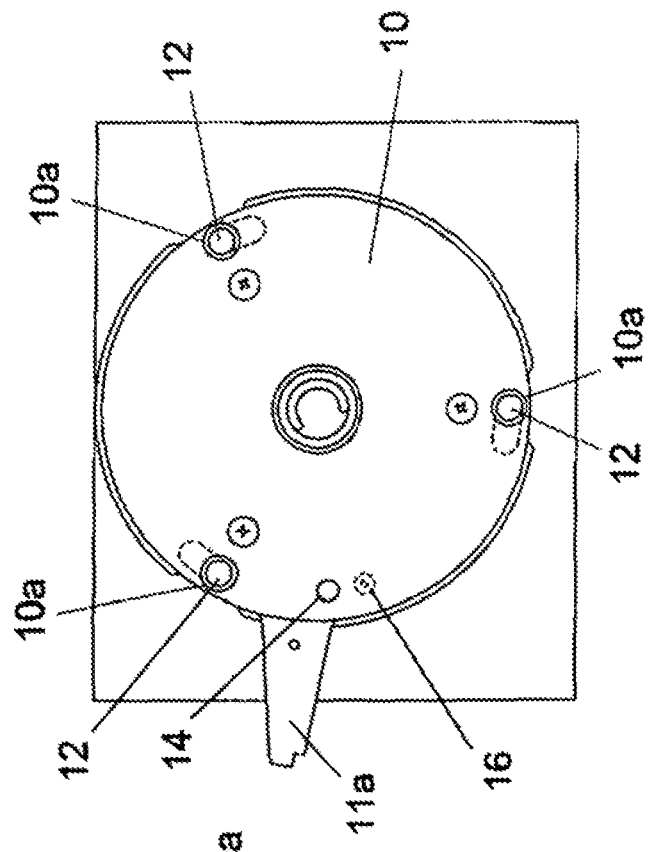
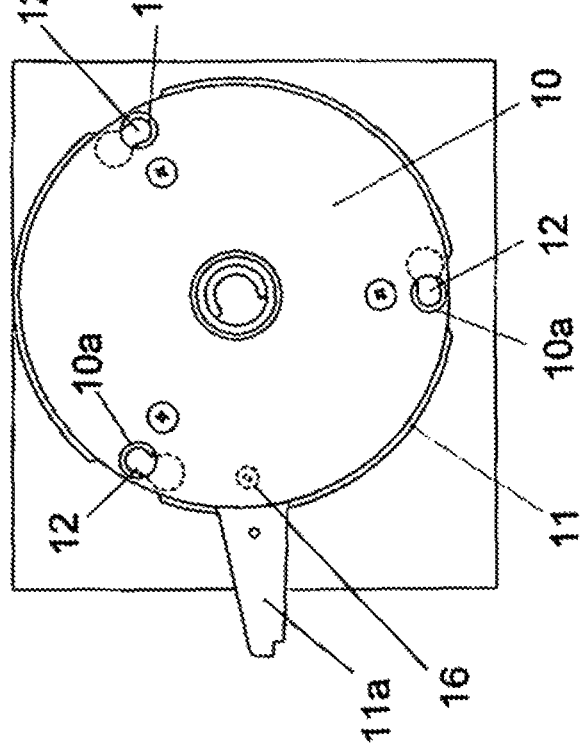

COMBINATION FOOD PROCESSING MACHINE

BACKGROUND

The field of application of the invention is the industrial sector dedicated to the manufacture and/or installation of kitchen equipment, such as food slicers, food processors, etc.

Persons skilled in the art are aware of the existence, in the current state of the art, of a wide range of devices and machines normally used in industrial kitchens and designed for food processing-related operations such as cutting vegetables, grating bread, emulsifying food products and other operations of a similar nature. In general, known machines essentially consist of: a motor block which houses a driving means, such as an electric motor; a lid element that closes the lower base of the motor block; a rotation axis that projects vertically through the aforementioned lid and which moves a cutting disk; and, a food processing accessory, the structural characteristics of which depend on the specific application for which it is designed. Therefore, said accessories may consist of a bowl-like container having an access lid and a blade in its interior (cutter-type machine, grater, etc.). Usually, in the case of cutting machines, the accessory may include a component for inserting food which may be connected to the aforementioned lid of the machine, having a mouth feed chute integrated with said food introducing element, where through the food is inserted towards the cutting disk while it can be forced with the help of a pushing device manually by the user. Naturally, these machines normally include safety and control devices that only allow operation of the machine when the different components thereof are in their respective operating positions.

In accordance with the foregoing, it is understood that the machines currently available on the market carry out certain specific functions such that, depending on the specific type or model of machine used, they can be performed with widely varying effectiveness and results. The present invention constitutes a substantial improvement in the operating and functional capabilities offered by current machines. The present invention is equipped to provide different functions depending on the accessory used by the user at a given time.

In this regard, the proposal of the present invention consists of a food processing machine that can be referred to as a "combined" machine, given that it allows the possibility of changing the accessories in a simple, fast and safe manner, thereby enabling the execution of different processing operations in accordance with the accessory used at a given time.

SUMMARY

The present invention relates to a combined food processing machine that provides novel characteristics and significant advantages with respect to known means used for the same purposes in the current state of the art.

More particularly, the invention proposes the development and construction of a machine of the type used in kitchens for processing food, especially intended and designed for combined functionalities such as a food cutter, emulsifier and chopper. Such machines typically include: a motor block which houses a driving element, such as an electric motor, and an electronic control board in its interior; a rotary axle projecting from said motor block for transmitting movement to different accessories which may be coupled to said motor block for performing different functionalities; and means for quickly anchoring and fixing the aforementioned accessories. A set of detectors, also included in the interior of the motor block, which transmit electrical signals to said electronic control board, allow the coupled accessory to be identified and, accordingly, determine the machine's operating mode. Likewise, the machine is also equipped with various safety devices that promote very safe operation for the user.

The combined food processing machine of the present invention is capable of performing, by changing the operating accessory, food cutting, emulsifying or cutting functions currently performed by other machines separately. It includes means and devices especially designed for: 1) anchoring and fixing the different accessories to be performed in a fast and simple manner; 2) detecting the specific accessory which has been coupled to the machine and automatically adjusting the operating parameters; and 3) guaranteeing maximum safety for the user by prohibiting the start-up of the machine if all the aforementioned functions are not completed.

In order to allow for the fast fixation of accessories, each of the accessories capable of being used with the machine includes, on its lower base, a number of stubs, preferably three, projecting vertically downwards and each having a respective perimeter throat. Said stubs are introduced into bayonet orifices made in a locking element which is coupled to the lid of the motor block. The locking element is allowed to rotate at a certain angle, in such a manner that in the anchored position it retains the aforementioned stubs in the bayonet orifices by coupling the narrowest portion of each orifice to the respective throat of the corresponding stub.

The detection of the type of accessory anchored to the machine is achieved through the inclusion of a certain number of sensors, generally magnetic sensors, located in predetermined positions in the interior of the motor block, in such a manner as to detect the presence of magnetised elements associated with each of the accessories. The machine is thereby capable of recognizing the accessory based on the sensors that are influenced by the magnetized elements of the particular accessory.

Finally, with regard to the safety elements, it has been envisaged that each accessory will also include certain magnet-bearing devices, in such a manner that the motor only receives power from the machine for startup thereof when the accessory is in an operational position (closed lids and retracted blades).

In order to fulfill the aforementioned operating requirements, the machine of the invention has a motor block having a stainless steel structure and upper closing means in the form of an aluminium lid or similar. The motor block houses functional parts such as the following in its interior: a driving element, an electronic control board, and a set of detection devices. The driving element preferably consists of an electric motor, wherefrom a drive shaft projects vertically through the lid and whereby the rotary movement is transferred to the operating components of the machine's different usable accessories. The electronic control board controls the general operation of the machine and receives the different instructions that the user introduces through a touch keyboard, which is positioned on the exterior of one of the walls of the motor block. The set of detection devices, generally magnetic sensors, generate the corresponding electrical signals when activated by the detection of the magnets associated with each of the accessories. The electrical signals generated by the detection devices are indicative of both the presence of an accessory and of the operating status thereof, and are transmitted to the control board in order for said board to perform the desired monitoring. The accessories, as mentioned earlier, may consist of cutter-type cutting devices, emulsifier devices or vegetable cutting devices or similar.

Terms such as vertical, horizontal, upper or lower, above or below, or others of an equivalent nature, are expressed in accordance with the machine's normal operating position.

BRIEF DESCRIPTION OF THE DRAWINGS

These and other characteristics and advantages of the invention will be explained with greater clarity in the following detailed description of an example of preferred embodiment thereof, provided only by way of illustration and not limitation, with reference to the accompanying drawings, wherein:

FIG. 4 shows a schematic, slightly perspective, view of the upper side of the interlocking part;

FIG. 5 shows a schematic, slightly perspective, view of the lower side of the interlocking part;

FIG. 6 shows a detailed view of the operation of the interlocking part in the locked position;

FIG. 7 shows a detailed view of the operation of the interlocking part in the open position;

Figure 1:
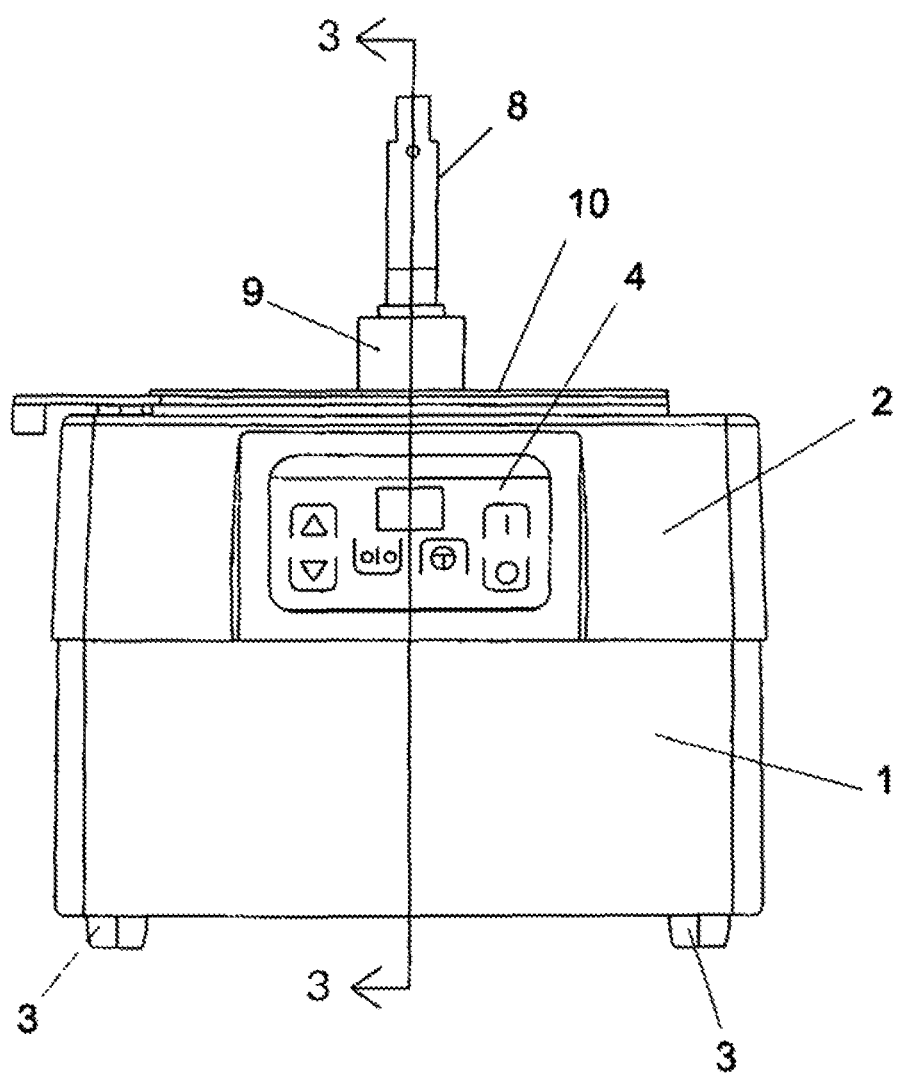
FIG. 1 shows a lateral elevational view of the motor block of the combined food processing machine as disclosed herein.

PARTS LIST 1. lower body (of the motor block)
2. lid (of the motor block)
3. legs
4. control panel (on the lid 2)
5. motor (inside motor block)
6. variable speed drive
7. electronic board (associated with control panel 4)
8. drive shaft
9. bushing (through which drive shaft passes)
10. support base
10a. orifices (in support base)
11. interlocking part (circular crown)
11a. activation/interlocking lever
12. bayonet type orifices in 11 (interlocking part)
13. elongated orifice in interlocking part (allows pin 28)
14. countersunk orifice in interlocking part 11
15. magnet (on lower side of 11, near 11a)
16. ball (housed in countersunk orifice)
17. spring
18. accessory
19. stubs (on bottom of accessory)
20. lid (of the accessory 18)
21. tubular casing
23. pin (that goes into orifice 13)
24. detector

DESCRIPTION OF A PREFERRED EMBODIMENT

The detailed description of the preferred embodiment of the invention is disclosed hereafter with the help of the accompanying drawings, which identify the numerical references used to designate equal or similar parts.

In reference to FIG. 1 of the drawings, a representation of the motor block of the machine of the invention can be observed therein. The motor block is composed of a lower body 1, of a rigid nature, made of stainless steel or equivalent material. The lower body 1 provides an internal space for housing the different operating parts of the machine and has lower support means in the form of three conventional legs 3. There is an upper closing means in the form of a lid 2 made of a lighter material, such as aluminium or similar, having a control panel 4 within the user's reach and, preferably, although not exclusively, of the tactile type.

Figure 3:
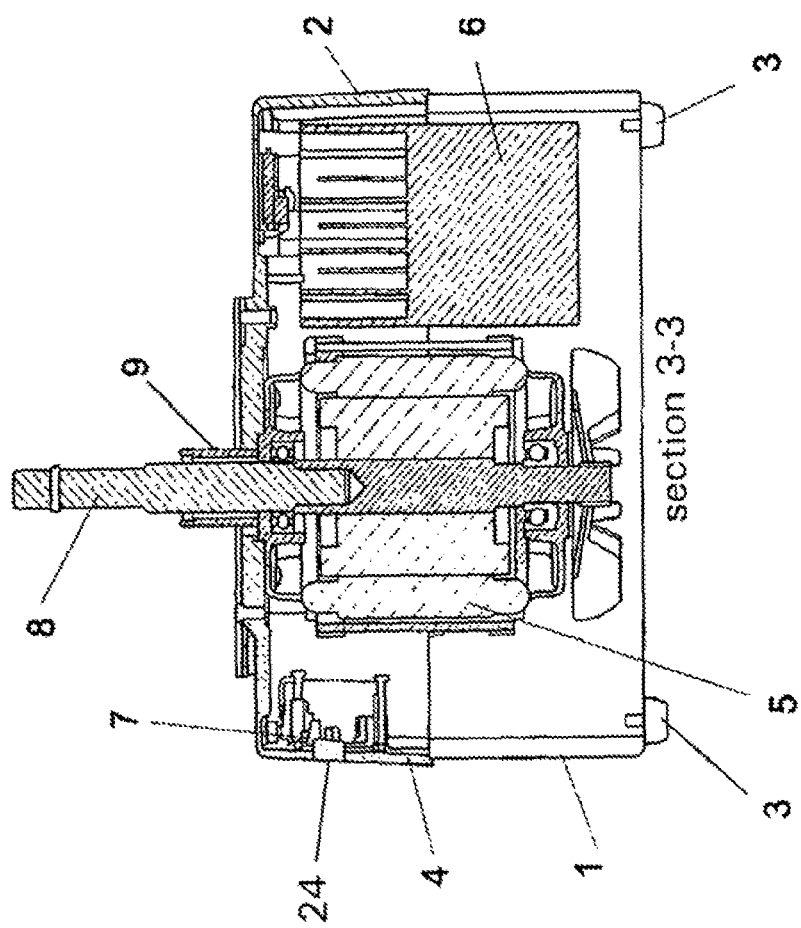
FIG. 3 shows an elevational view of a cross-section taken along line 3-3 of FIG. 1.

The cross-section taken along line 3-3 shown in FIG. 3 shows the internal parts of the machine's motor block, essentially consisting of a motor 5, preferably an electric motor that constitutes the driving part wherefrom the rotary movement is transmitted to a drive shaft 8. The drive shaft 8 projects through the lid 2, advantageously guided by a bushing 9 with the help of bearings and conventional tightening means. The internal parts of the motor block may also include a variable speed drive 6, which preferably consists of a frequency converter. The motor block also houses an electronic control board 7 associated with the control panel 4 wherein the necessary electronics for the operating and functional control of the machine as a whole are installed. Additionally, the motor block includes a plurality of detection elements, particularly magnetic sensors 24.

Figure 2:
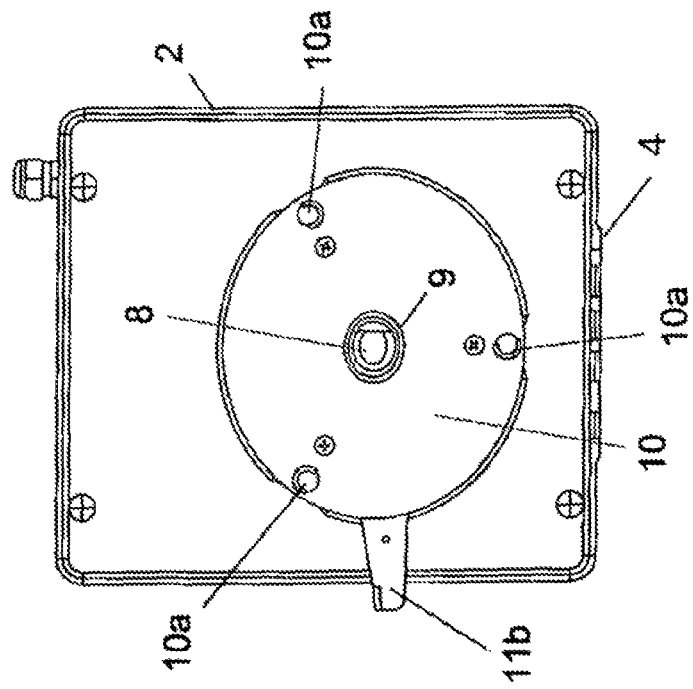
FIG. 2 shows a top plan view of the motor block of the combined food processing machine as disclosed herein.

Encircling the guide bushing 9 of the drive shaft 8, as can be more clearly observed in FIG. 2, is a support base 10 above the top plane of the motor block lid 2. The support base 10 provides a support surface for the different accessories that can be associated with the machine for performing the different food cutting, emulsifying or chopping functions. The support base 10 includes a series of pass-through orifices 10a made in said base 10.

The inclusion of an interlocking part 11 (for anchoring and fixing accessories) is associated with said support base 10. The interlocking part 11 can be more clearly observed in FIGS. 4 and 5. The interlocking part has a lever 11a (also referred to in the present description as interlocking lever) that projects outwards. Said lever 11a of the interlocking part 11 has sufficient length and an adequate configuration for the user to actuate it in both directions of rotation for fixing or releasing the accessory located on the support base 10, as will be explained herein.

In FIG. 2, the support base 10 shown has three orifices 10a evenly spaced by angular separations of 120°. It shall be understood that this number of orifices is only a form of preferred embodiment and can vary in accordance with each need or preference.

As shown in FIG. 4 of the drawings, the interlocking part 11 consists of a part configured by way of a circular crown—a flat part composed of two circumferences that possess the same center, with a material thickness—wherefrom the aforementioned lever 11a radially projects. Said interlocking part 11 has sufficient width to allow the formation therein of three bayonet orifices 12, also evenly spaced by angular separations of 120° and capable of overlapping with the orifices 10a of the base 10. The bayonet orifices are comprised of two areas, with one having a smaller diameter than the other. In an approximately intermediate position between two successive bayonet orifices 12, the formation of a new pass-through elongated orifice 13, having an elongated shape and a length equivalent to an arc of approximately 10°, has been envisaged. Also, in a position opposite to that of the starting position of the interlocking lever 11a another countersunk orifice 14, disposed in an approximately centred position with respect to the width of the interlocking part 11, has been made.

FIG. 5 of the drawings shows the same interlocking device of FIG. 4, but inverted, i.e. seen on its opposite side (lower side) and coupled to the base 10. The interlocking part 11 can rotate in both directions, as indicated by the arrow $F_1$. The lever 11a includes on this lower side a magnet 15 attached thereto, which can be used as a lever position indicator, as will be explained herein. In the position represented in FIG. 5, it can be observed that the part of each bayonet orifice 12 with the greatest diameter is positioned opposite a corresponding orifice 10a in the support base 10.

The changes in the position of the interlocking part 11 by actuation of the lever 11a from the exterior, according to arrow $F_1$, appear more clearly indicated in FIGS. 6 and 7.

In FIG. 6, the assembly is in the locked position, whereby the accessory can be positioned and secured on the support base 10. In this position, the lever 11a has been actuated by the user so that the narrow bayonet part of each bayonet orifice 12 is aligned with and positioned opposite to the respective orifice 10a of the support base 10.

The position shown in FIG. 7 corresponds to the release state, as the lever 11a has been actuated in such a manner that the interlocking part 11 now has the part of its bayonet orifices 12 with the greatest diameter aligned with and positioned opposite to the respective orifice 10a of said base 10.

FIG. 7 also shows a means for retaining the lever 11a when the anchoring device is in the locked state, consisting of a ball 16 (designated by a broken line due to being located below the support base 10), which is impelled upwards by a spring 17, as can be more clearly observed in FIG. 11. The diameter of the ball 16 has been adequately dimensioned to allow housing thereof in the countersunk orifice 14, visible in FIG. 5.

Figure 8:
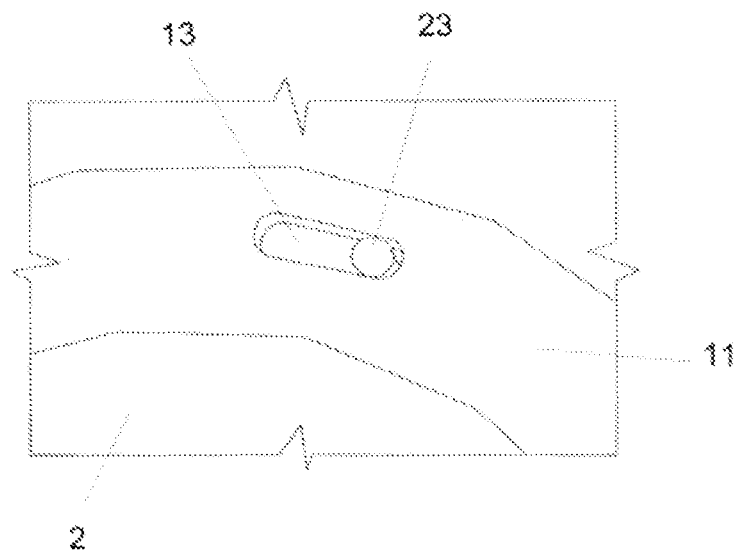
FIG. 8 shows a schematic view of the elongated orifice of the interlocking part and the pin which it houses.

Additionally, the interlocking part 11 is designed in such a manner that its rotary movement in both directions indicated by the arrow $F_1$ is limited to a predetermined angle which in practice will be in the order of 10°. Said limitation is imposed by a pin 23 that projects from the surface of the motor block lid 2 and is visible in FIG. 8 of the drawings, housed in the elongated orifice 13 of the interlocking part 11. The length of this orifice determines the amplitude of the rotation angle.

Figure 9:
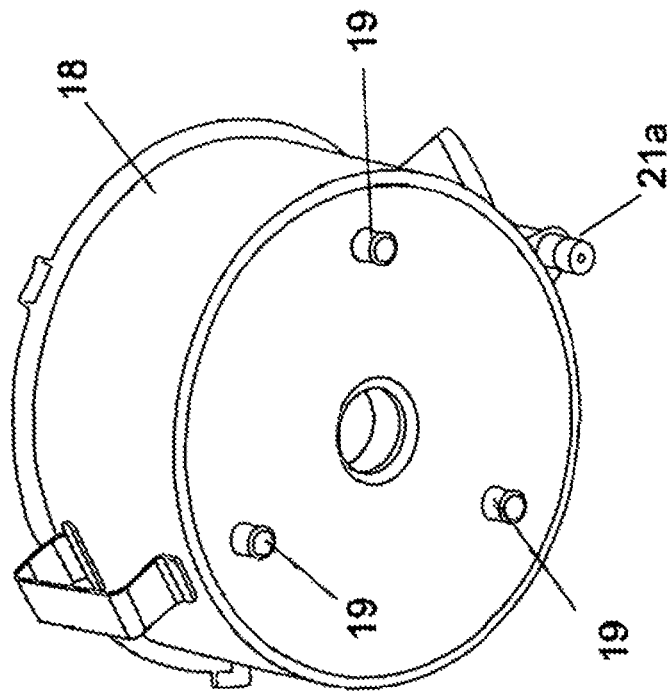
FIG. 9 shows a bottom perspective view of an accessory intended for use in the disclosed machine.
Figure 10:
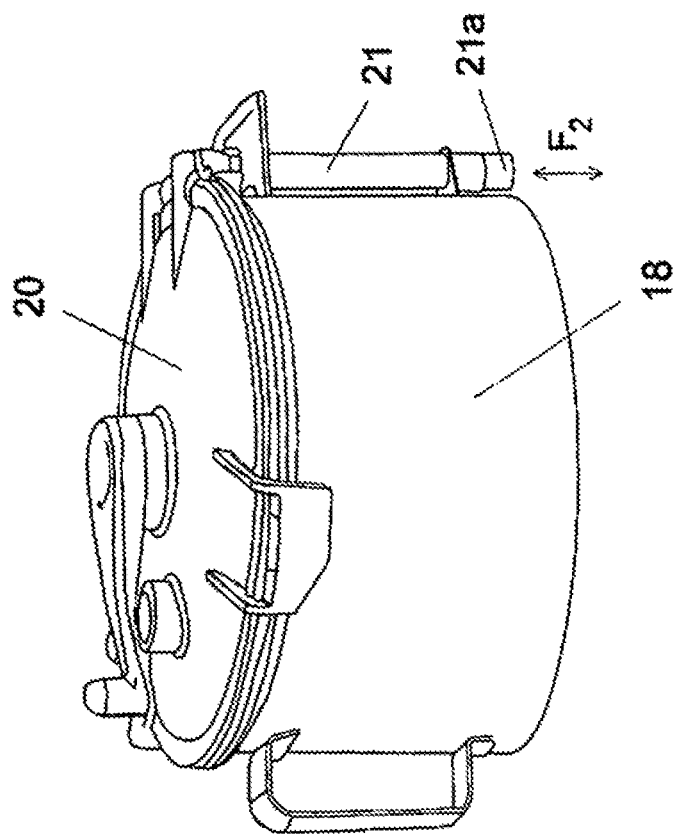
FIG. 10 shows a perspective view of an accessory intended for use in the disclosed machine

In reference to FIGS. 9 and 10 of the drawings, these show two views of an accessory of the type used jointly with the motor block of FIGS. 1 to 3. In this case, a conventional cutter-type accessory has been chosen as an example, consisting of a bowl 18 designed for containing in its interior a cutting blade, grating means or any other conventional means in the state of the art. However, the following explanation is applicable to any other accessory having the characteristic of being usable with the machine of the present invention. To this end, the accessories designed for use with the machine of the invention must include means that will allow, on one hand, secure fixation of the accessory to the support base 10 and, on the other, detection of the presence of said accessory and accurate identification of the characteristics and operating state thereof.

For the fixation of the device, the accessory 18 has been envisaged to include stubs 19 on the lower base. The stubs 19 can be observed in FIG. 9, and project orthogonally from the lower side of the bowl 18 part of the accessory, having a diameter such that they may be inserted through the orifices 10a. The stubs 19 are configured such that they have a recessed perimeter by way of a throat that is of a smaller diameter than the rest of the stub 19. The diameter of the throat of the stubs is sized so that it may be introduced into the area of the bayonet orifice with the smaller diameter. Said stubs 19 are introduced into the orifices 10a while the interlocking part 11 is in the aperture or release state as shown in FIG. 7. The lever 11a can be actuated by the user in order to move the interlocking part 11—into the locked position of FIG. 6. When in the locked position the bayonet portion of each bayonet orifice 12 of the interlocking part 11 is coupled to the throat of the respective stub 19, retaining the accessory without the possibility of separation from the base 10 on which it rests. With the lever 11a in the locked position, the ball 16 is housed in the countersunk orifice 14 of the interlocking part 11 by the force of the spring 17, thereby guaranteeing that said locked state is maintained regardless of the eventual vibrations or other external conditions, until the user manually actuates said lever 11a to move the interlocking part 11 into the aperture or release position.

Other capacities associated with the general functionality of the combined food processing machine proposed by the present invention. In particular, the machine's capacity to automatically detect the type of accessory which has been included therein, as well as to know the operating state of said accessory in order for the electronic control board 7 to evaluate whether the machine can be started up or not. In this regard, the cutter accessory 18 or any other selected accessory will have one or more magnetised elements located on the lower side of the base of the accessory, in such a manner that the accessory can be identified in accordance with the position occupied by said magnetised elements, thereby determining the speed at which the motor 5 must spin and, likewise, the drive shaft 8.

Additionally, each accessory also includes an element that provides information on the operating state thereof and which essentially consists of a magnetised element which, by virtue of its position, may be detected by the corresponding detection element, in this case a magnetic sensor 24, of the machine thereby allowing the machine to start up only under the established safety conditions. For example, in the case of the cutter accessory 18, the aforementioned safety element may provide information as to whether the lid 20 is placed over the bowl, thereby keeping the cutter's mobile parts (especially the blade in its interior) out of the user's reach in order to avoid accidents.

In the represented embodiment shown in FIG. 10, the safety element consists of a mobile shaft bearing a magnetised element housed inside a tubular casing 21 against the action of an internal spring (not shown in the figure). The tubular casing 21 is closed at its lower end by means of a screw-cap 21a which serves as a support for the aforementioned internal spring. The shaft and its associated magnet are movable vertically in both directions, upwards and downwards, as shown graphically by the arrow $F_2$ of FIG. 10. When the lid 20 is placed over the accessory 18 to close the mouth of the accessory bowl 18 and prevent access to the interior thereof, the inner shaft and its associated magnet are pushed downward, moving closer towards the position of a corresponding sensor 24 located in the interior of the motor block (not shown in the figure). The aforementioned sensor 24 is influenced by the magnetic field associated with the magnetised element and allows identification of the closed lid state, informing the electronic control board 7 accordingly and allowing the machine to start up.

Conversely, when the lid 20 is open, the shaft is moved upwards by virtue of the force exerted by the aforementioned return spring, and the increased distance of said magnetised element from the aforementioned sensor is sufficient for the latter to avoid being influenced by the magnetic field of the former, thereby identifying said open lid condition and disabling machine startup.

Additionally, in order to facilitate the operability of the assembly and avoid errors, the cutter accessory 18 may have a lid 20 with the peculiarity of being symmetrical in terms of its three anchoring or hooking points, in such a manner that the user does not have to worry about orienting the lid in a certain manner, thereby simplifying and expediting the accessory coupling operation.

It shall be understood that other accessories will also have adequate mechanisms for configuring each to impel a shaft (or other elements), similar to the shaft with the previously described magnetised element in the interior of the tubular casing 21 for the purpose of determining whether the machine start-up conditions are fulfilled. These mechanisms can be capable of vertical, horizontal and rotary movement or a combination of any of these, provided that they allow actuation by magnetic transmission to the envisaged machine sensors for such purpose.

Figure 11:
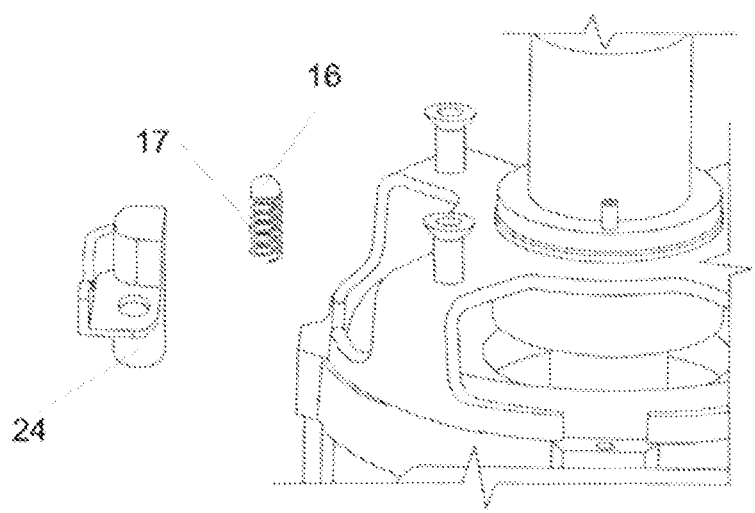
FIG. 11 shows an illustrative representation of a partial exploded view of an example of use and distribution of auxiliary internal elements, including the presence of an example of a magnetic sensor of those integrated in the machine for identifying the accessories and operating status thereof.

Finally, FIG. 11 shows a conventional magnetic sensor 24 for use in the machine, located inside the motor block for the envisaged purposes described earlier herein. The envisaged magnetic sensor 24 occupies a position such that it is opposed to the corresponding activator means.

The aforementioned FIG. 11 also shows a representation of the positional fixing means envisaged for retaining the interlocking lever 11*a* composed of a ball 16 which is pushed upwards by means of a spring 17.

In accordance with the foregoing and by way of an example of specific application, the aforementioned magnetic sensor 24 could, by virtue of the position it occupies, interact with the magnet 15 fixed to the lower side of the interlocking lever 11*a*. Said sensor will communicate to the electronic control board 7 that the lever has reached the interlocking operating position of the accessory on the machine and, therefore, the machine can be started up unless there are other obstacles. It shall be understood that there will be a certain number of other sensors distributed throughout the surrounding space, for the purpose of performing the different detection capabilities described herein and thereby automatically determining not only the presence of a specific accessory, but also the manner in which the machine must operate in accordance with the detected accessory.

Extending the content of the present description is not deemed necessary for an expert skilled in the art to understand its scope and the advantages derived from the object thereof.

Notwithstanding the foregoing, and as the description made refers solely to an illustrative example of embodiment of the object of the invention, it shall be understood that multiple variations in detail, such as the shape, size or materials used to manufacture the assembly or its parts or any others that do not alter the invention, as it has been described and as defined in the following claims.

The invention claimed is:

1. A food processing machine comprising:

a motor block comprised of a lower body and lid;

an electric motor mounted within the motor block;

a variable speed drive coupled to the motor;

a drive shaft coupled to the motor;

an electronic control board mounted on the motor block;

a control panel connected to the electronic control board;

detection elements positioned in the interior of the motor block;

a food processing accessory mounted on said drive shaft and magnets located in the base of the accessory at predetermined locations that are specific to the identification of the accessory, wherein the detection elements detect the presence and established safety conditions of the accessory and convey such information to the electronic control board by way of electrical signals generated by the detection elements; and an interlocking part which secures the accessory to the motor block, wherein said interlocking part is capable of being rotated about said interlocking part's center; and above the interlocking part is a support base on which the accessory rests;

wherein the interlocking part includes: multiple bayonet orifices arranged in evenly spaced positions; an elongated orifice positioned between two of the bayonet orifices; a countersunk orifice on the lower side thereof; a lever which projects radially from the outer circumferential perimeter of the interlocking part; and, a magnetized element attached to the lower side thereof.

2. The food processing machine of claim 1 wherein a pin projects from the lid of the motor block and is housed in the elongated orifice of the interlocking part.

3. The food processing machine of claim 2 wherein the support base includes pass through orifices in a position adjacent to the bayonet orifices of the interlocking part.

4. The food processing machine of claim 3 wherein the accessory includes stubs which project orthogonally from the base thereof with a diameter to allow insertion of said stubs into the pass through orifices of the support base and the corresponding bayonet orifices of the interlocking part; said stubs have a perimeter throat of a lesser diameter than the rest of the stub.

5. The food processing machine of claim 4 wherein the countersunk orifice of the interlocking part is positioned so that when the interlocking part is in the locked position, the countersunk orifice aligns with a ball that is pushed upwards by the force of a spring such that the ball is housed in the countersunk orifice.

6. The food processing machine of claim 1 wherein the accessory includes a movable element which adjusts the position of a magnet associated therewith in relation to a detection element in the motor block depending on whether the lid of the accessory is in the open or closed position.

7. The food processing machine of claim 6 wherein the movable element is comprised of a tubular casing closed at said tubular casing's lower end by a screw-cap; the tubular casing houses a mobile shaft to which a magnetized element is attached at the lower end thereof, below which is a return spring positioned such that the magnetized element is in contact with the top end of the spring and the screw-cap is in contact with the lower end of the spring.

8. The food processing machine of claim 3 wherein there are three pass through orifices in the support base and three bayonet orifices in the interlocking part, wherein the orifices are evenly spaced by an angular separation of 120 degrees.

* * * * *